Figure 1:
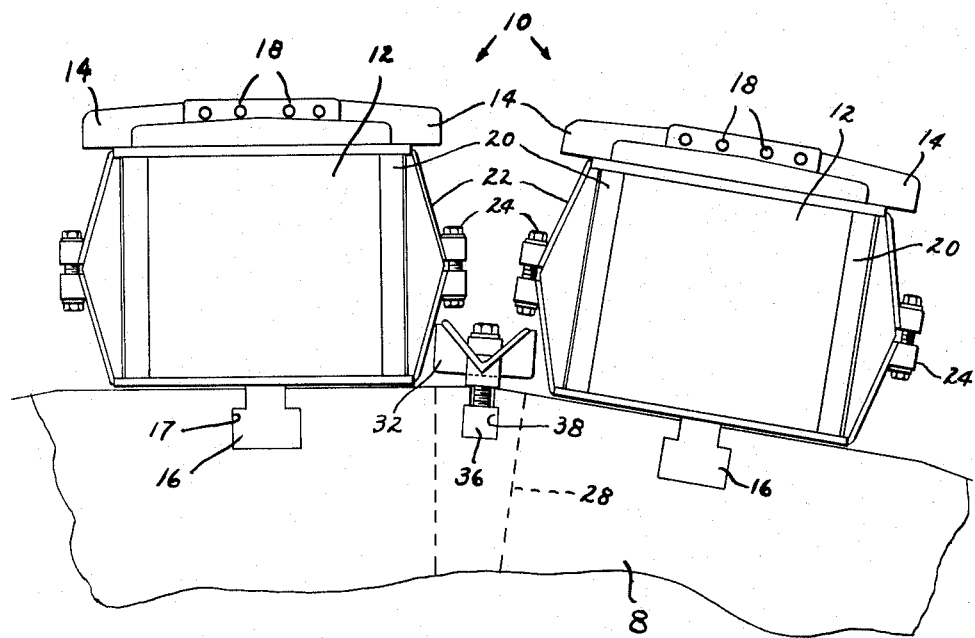

July 19, 1966      J. P. FRANZ      3,261,994

AIR COOLING ARRANGEMENT FOR SALIENT POLE ROTORS

Filed Nov 27, 1963

INVENTOR.
JOSEPH P. FRANZ
BY *James R. Campbell*
HIS ATTORNEY

United States Patent Office 3,261,994
Patented July 19, 1966

3,261,994
AIR COOLING ARRANGEMENT FOR SALIENT POLE ROTORS
Joseph P. Franz, Ballston Lake, N.Y., assignor to General Electric Company, a corporation of New York
Filed Nov. 27, 1963, Ser. No. 326,530
8 Claims. (Cl. 310—61)

The invention described herein relates to dynamoelectric machines and particularly to a ventilation means useful in diverting air into contact with field pole windings on a salient pole rotor.

In the design of synchronous motors and generators in ratings greater than about 30,000 kva. and of the type having salient field poles disposed on the rotor peripheral magnetic core, spaced air ducts are provided such that they extend from the inner portions thereof into that space existing between adjacent field poles commonly called rim ventilated machines. Air is pumped or otherwise caused to flow through the duct openings and into contact with the windings located on the field poles for carrying away heat generated therein during operation.

In carrying out experimental work on this kind of machine, it was found that by either completely closing off the air ducts, or leaving them open, both the magnitude and rate of temperature rise in the field pole windings was about the same. However, further work indicated the optimum cooling and therefore the minimum temperature rise in the field pole windings occurred when the ducts were partially closed off. Also, the maximum air velocity occurred on the center line between adjacent poles with a lesser amount flowing along the sides of the coils. In addition to this, when the rotor was rotated, the component of the radial velocity of air was so great that it blocked the introduction of air flow in an axial direction into the interpolar space.

Since these characteristics in the air flow pattern bear directly on the performance of this design of machine, it became evident that an improved structural arrangement was necessary to capitalize fully on the maximum available air velocities to provide an air brushing or wiping action along the exposed surfaces of the coils and in both a radial and axial direction.

The primary object of my invention therefore is to provide an improved air deflector construction in the interpolar space capable of efficiently carrying away heat generated in the field pole windings.

In carrying out my invention I locate a deflector preferably of V-shape configuration in the interpolar space and support it in spaced relationship with the rotor surface, air ducts and the adjacent field pole windings. To obtain optimum distribution of cooling air, the deflector is designed to divert the air entering the interpolar space radially and axially into contact with the windings disposed on the salient field poles.

Figure 2:
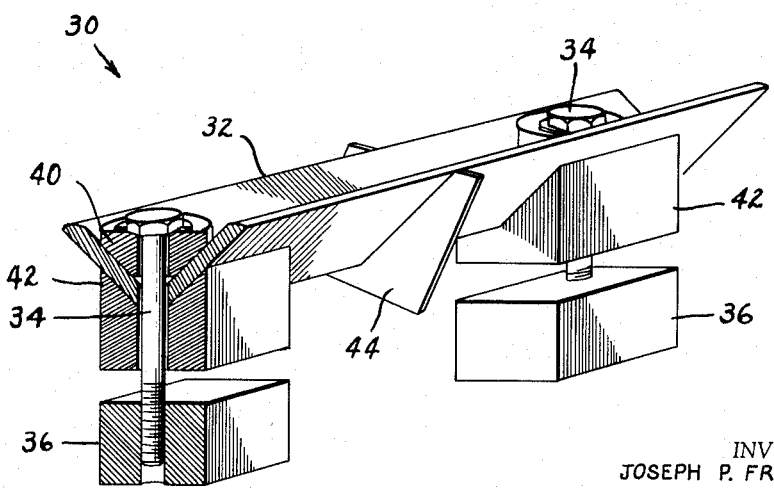

While the specification concludes with claims particularly pointing out and distinctly claiming the subject matter which I regard as my invention, it is believed the invention will be better understood from the following description taken in connection with the accompanying drawings in which:

FIGURE 1 is an end view of a portion of a salient pole rotor illustrating the disposition of the air deflector between adjacent field poles, and FIGURE 2 is an enlarged view of the deflector including the means for securing it to the rotor body.

Referring now to the drawings wherein like reference characters designate like or corresponding parts throughout the several views, there is shown in FIGURE 1, a portion of a rotor 8 including a pair of adjacent field poles 10, each comprising a multitude of laminations 12 forming a pole tip having an overhanging projection 14 at one end and a T-shaped wedge 16 at its other end. As in conventional designs, the wedge 16 coacts with a rotor slot 17 for firmly anchoring the pole in position. Also, each pole is equipped with an amortisseur winding 18 and a coil or winding 20 attached to the pole body by straps 22 and a bolting arrangement 24. The particular arrangement for securing the coils to the pole body is disclosed and claimed in the copending application of Harry Ommundson, Serial No. 290,776, filed June 26, 1963, entitled Coil Support for Salient Pole Rotors, and assigned to the same assignee as the present invention.

To provide ventilating air to the windings 20, the rotor is equipped with radially extending air ducts 28 communicating at their inner ends with void spaces formed by the rotor rim used in supporting the field pole assembly and terminating at their outer ends in openings spaced axially along the pole length.

The particular improvement of this invention resides in locating an air deflector 30 in each interpolar space and consists of a V-shaped deflector 32 extending substantially the complete axial length of the poles. The deflector is secured to the rotor by a multitude of bolts 34 having screw threads engageable with individual blocks 36 movably positioned in an axially extending slot 38 in the interpolar space. To provide a base against which the top of the bolts 34 may rest, individual support blocks 40 having flat sides shaped to the configuration of the V-shaped deflector and equipped with a central bore are located between the deflector and the bolt head.

To space the deflector from the rotor surface, a multitude of separate spacers 42 likewise shaped to the configuration of the deflector are welded thereto along the abutting edges and have a bottom surface complementary to the rotor surface upon which they rest. Although individual blocks 36 are located in the slot 38 near the rotor surface, it will be apparent that a single block may be used in those installations where the single block will not impede the flow of cooling air into the interpolar space.

During the time the rotor is in operation, air introduced through the separate air ducts 28 spaced along the rotor axial length, flows radially outward into contact with the exposed surface of the deflector 32. Upon striking the deflector, it is diverted circumferentially or tangentially into contact with the field coils where it performs a brushing action and thus absorbs heat from the field pole windings prior to being discharged outwardly between the adjacent salient poles.

In those installations where it is desirable also to impart an axial flow component to the air, vanes 44 are welded to the underside of the deflector 32. As shown, the vanes conform to the underside of the deflector and are tilted at an angle thereto for causing part of the total mass of air to be diverted in an axial direction, thus providing for additionally imparting axial movement to the air in the interpolar space. The combination of deflector 32 and vanes 44 therefore act to cause the air to be diverted in a tangential or circumferential direction for contact with the field pole windings prior to being discharged radially from the interpolar space; while the vanes 44 act to impart a generally axial component to it for obtaining flow between the poles and along their length.

Since it is desirable to have the air mix or commingle as thoroughly as possible and thereby contact all parts of the field coils, the vanes on the deflector between one pair of adjacent salient poles may be tilted to obtain air movement in a forward axial direction, while those vanes located on the deflector between the next adjacent pair of poles may be tilted in the opposite direction to obtain air flow in the reverse direction. This circular air flow pattern is effective in establishing good heat exchange relationship between the air and the field pole windings for carrying away the heat generated therein during operation.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A salient pole rotor comprising:
   a magnetic core supporting a multiplicity of field poles having windings thereon and air ducts extending radially from the inner portions of the rotor into the interpolar spaces,
   a deflector secured exclusively to the rotor surface and positioned between each pair of adjacent poles,
   said deflector comprising a baffle spaced from the rotor surface by spacers and located over the rotor air ducts,
   whereby air flowing through the air ducts is diverted by the deflector into contact with the field windings prior to being discharged from the machine.

2. A salient pole rotor comprising:
   a magnetic core having a multiplicity of field poles attached to its outer peripheral surface,
   axial air ducts extending from the inner portions of the rotor and terminating in the interpolar spaces,
   a deflector secured exclusively to the rotor surface between each pair of adjacent poles and extending along the pole axial length,
   spacing means locating the deflector over the air ducts and at a predetermined distance outward from the rotor surface,
   means positioned in a slot extending the rotor axial length engageable by locking devices interconnecting the deflector therewith for firmly anchoring the deflector in the interpolar space,
   whereby air flowing through the air ducts is diverted by the deflector into contact with the field poles prior to being discharged from the machine.

3. A salient pole rotor comprising:
   a magnetic core supporting a multiplicity of field poles on its outer peripheral surface and having air ducts extending radially between the inner portions of the rotor and the interpolar spaces,
   an axially extending slot in the rotor between adjacent poles,
   a locking device securing a deflector in each of the rotor interpolar spaces and in a position over the air ducts,
   each of said locking devices comprising a support having a surface complementary to the surface of the deflector and being equipped with a central bore for reception of a bolt,
   means located in said slot engageable by said bolt for firmly anchoring the deflector in each of the interpolar spaces,
   whereby air flowing through the air ducts is diverted by the deflector into contact with the field poles prior to being discharged from the machine.

4. A salient pole rotor comprising:
   a magnetic core supporting a multiplicity of field poles on its outer peripheral surface,
   air ducts extending radially from the inner portions of the rotor and terminating in the interpolar spaces,
   a V-shaped deflector secured to the rotor surface and positioned between each pair of adjacent poles and over said air ducts,
   a slot in the rotor surface between each of said poles and extending the axial length thereof,
   a plurality of axially extending locking devices for each deflector, each of said devices including a bolt extending radially between the V-shaped deflector and terminating in a separate block disposed in each of said slots,
   said locking device further including a pair of elements having surfaces respectively complementary to the inner and outer surfaces of the V-shaped deflector thereby providing a support for said bolts and for spacing the deflector from the rotor surface,
   whereby air flowing through the air ducts is diverted by the deflector into contact with the field poles prior to being discharged from the machine.

5. The combination according to claim 4 wherein said blocks in said slots constitute a single bar engageable by the bolts extending radially inward from the deflector.

6. The combination according to claim 4 wherein each deflector is equipped with at least one air deflecting vane mounted on its surface for diverting the air in a generally axial direction between each adjacent pair of field poles.

7. A salient pole rotor comprising:
   a magnetic core supporting a multiplicity of field poles on its outer peripheral surface,
   air ducts extending radially from the inner portions of the rotor and terminating in the interpolar spaces,
   a deflector in each interpolar space positioned over the air ducts and located in spaced relationship with the rotor surface by spacing means,
   separate locking means positioned along the deflector axial length for securing each deflector to the rotor surface,
   each of said locking means including bolts extending radially inward through the deflector and terminating in separate blocks movably fixed in a slot in the rotor surface beneath the deflector and extending the rotor length,
   and vanes secured to the underside of the deflector and at an angle between the horizontal and vertical for deflecting air in an axial direction between each adjacent pair of poles,
   whereby air flowing through the air ducts is diverted by the deflector and the vanes into contact with the field poles prior to being discharged from the machine.

8. The combination according to claim 7 wherein the vanes positioned on the deflectors alternate in axial directions so that air is caused to circulate in a circular path between adjacent pairs of poles.

References Cited by the Examiner

UNITED STATES PATENTS

| 2,654,037 | 9/1953 | Henter | 310—60 |
| 2,899,573 | 8/1959 | Wesolowski | 310—60 |
| 2,974,239 | 3/1961 | Havelka et al. | 310—61 |

MILTON O. HIRSHFIELD, *Primary Examiner.*

ORIS L. RADER, *Examiner.*

L. L. SMITH, *Assistant Examiner.*